(12) United States Patent
Ishikawa et al.

(10) Patent No.: US 11,225,152 B2
(45) Date of Patent: Jan. 18, 2022

(54) FUEL CELL VEHICLE

(71) Applicant: TOYOTA JIDOSHA KABUSHIKI KAISHA, Toyota (JP)

(72) Inventors: Daisuke Ishikawa, Toyota (JP); Hiroaki Nishiumi, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 154 days.

(21) Appl. No.: 16/676,594

(22) Filed: Nov. 7, 2019

(65) Prior Publication Data

US 2020/0207224 A1    Jul. 2, 2020

(30) Foreign Application Priority Data

Dec. 26, 2018   (JP) .............................. JP2018-243323

(51) Int. Cl.
*B60L 50/72*  (2019.01)
*B62D 21/15*  (2006.01)
*H01M 8/2475*  (2016.01)

(52) U.S. Cl.
CPC .............. *B60L 50/72* (2019.02); *B62D 21/15* (2013.01); *H01M 8/2475* (2013.01); *B60Y 2306/01* (2013.01); *H01M 2250/20* (2013.01)

(58) Field of Classification Search
CPC ........ B60L 3/007; B60L 3/0053; B60L 50/71; B60L 50/72; B60Y 2306/01; B62D 21/15; H01M 2250/20; H01M 8/2465; H01M 8/247; H01M 8/2475
See application file for complete search history.

(56) References Cited

U.S. PATENT DOCUMENTS

| | | | | |
|---|---|---|---|---|
| 2003/0070858 | A1* | 4/2003 | Kondo | B60L 50/71 180/291 |
| 2006/0177722 | A1* | 8/2006 | Inagaki | H01M 8/0271 429/434 |
| 2014/0367182 | A1* | 12/2014 | Yoshinaga | B60L 50/52 180/68.4 |

FOREIGN PATENT DOCUMENTS

JP    2007-335184 A    12/2007

* cited by examiner

*Primary Examiner* — Adam A Arciero
(74) *Attorney, Agent, or Firm* — Dickinson Wright, PLLC

(57) ABSTRACT

A fuel cell vehicle capable of determining, when a fuel cell vehicle collides with a rigid body, whether a stack is damaged by a visual observation at a low cost. A fuel cell vehicle includes: a fragile part configured to be located so as to come into contact with a side surface of the stack frame that is orthogonal to a direction in which cells in the stack are stacked, and be deformed when a preset collision force causing damage to a stack is applied; and a deformation part configured to form a part of the vehicle body, and be deformed and come into contact with the fragile part when a collision force is applied to the vehicle body.

5 Claims, 11 Drawing Sheets

FUEL CELL VEHICLE

CROSS REFERENCE TO RELATED APPLICATIONS

This application is based upon and claims the benefit of priority from Japanese patent application No. 2018-243323, filed on Dec. 26, 2018, the disclosure of which is incorporated herein in its entirety by reference.

BACKGROUND

The present disclosure relates to a fuel cell vehicle, for example, to a fuel cell vehicle in which a stack is fixed to a vehicle body of the fuel cell vehicle via a stack frame.

As disclosed in Japanese Unexamined Patent Application Publication No. 2007-335184, a stack in which a plurality of cells are stacked is mounted on a typical fuel cell vehicle. Then, the stack is fixed to the vehicle body via a rigid stack frame so that the stack is not damaged when a collision force is applied to a fuel cell vehicle. Note that strength of a stack frame is set to a value larger than a collision force causing damage to the stack, which is applied to the stack.

SUMMARY

The applicant has however found the following problems. In a typical fuel cell vehicle, if there is no external damage on a stack when a fuel cell vehicle collides with a rigid body, it is impossible to determine whether the stack is damaged, due to a lateral displacement or the like that has occurred in cells in the stack, in a direction orthogonal to a direction in which the cells in the stack are stacked by only visually observing the stack.

Therefore, in order to determine whether a collision force causing damage to a stack in a direction orthogonal to the direction in which cells in the stack are stacked has been applied to the stack, a typical fuel cell vehicle includes an acceleration sensor, a pressure sensor, and the like mounted on a vehicle body thereof. However, this causes a problem of a cost increase.

The present disclosure has been made in view of the above-described problem and provides a fuel cell vehicle capable of determining, when a fuel cell vehicle collides with a rigid body, whether a stack is damaged in a direction orthogonal to a direction in which cells in the stack are stacked by a visual observation at a low cost.

A first exemplary aspect is a fuel cell vehicle in which a stack is fixed to a vehicle body via a stack frame, the fuel cell vehicle including:

a fragile part configured to be located so as to come into contact with a side surface of the stack frame that is orthogonal to a direction in which cells in the stack are stacked while the stack is fixed to the stack frame, and be deformed when a preset collision force causing damage to a stack is applied; and a deformation part configured to form a part of the vehicle body, and be deformed and come into contact with the fragile part when a collision force is applied to the vehicle body.

According to such a configuration, by visually observing a fragile part, it is possible to determine whether a stack is damaged in a direction orthogonal to a direction in which cells in the stack are stacked, thereby enabling an acceleration sensor and a pressure sensor for detecting a collision force applied to the stack, which are mounted on a typical fuel cell vehicle, to be omitted.

Thus, it is possible to determine, when a fuel cell vehicle collides with a rigid body, whether a stack is damaged in a direction orthogonal to a direction in which cells in the stack are stacked by a visual observation at a low cost.

In the above-described fuel cell vehicle, the fragile part is preferably a projection part configured to be projected from the side surface of the stack frame that is orthogonal to the direction in which the cells in the stack are stacked.

According to such a configuration, it is possible to integrally form the fragile part with the stack frame.

In the above-described fuel cell vehicle, a thickness of the fragile part preferably becomes thinner toward an outside of the stack frame.

According to such a configuration, it is possible to greatly deform a tip of the fragile part when a collision force is applied to the fragile part, thereby enabling a deformation of the fragile part to be easily visually observed.

According to the present disclosure, it is possible to determine, when a fuel cell vehicle collides with a rigid body, whether a stack is damaged in a direction orthogonal to a direction in which cells in the stack are stacked by a visual observation at a low cost.

The above and other objects, features and advantages of the present disclosure will become more fully understood from the detailed description given hereinbelow and the accompanying drawings which are given by way of illustration only, and thus are not to be considered as limiting the present disclosure.

DESCRIPTION OF EMBODIMENTS

Specific embodiments to which the present disclosure is applied will be described hereinafter in detail with reference to the drawings. However, the present disclosure is not limited to the embodiments shown below. Further, for the clarification of the explanation, the following descriptions and the drawings are simplified as appropriate.

First Embodiment

Figure 1:
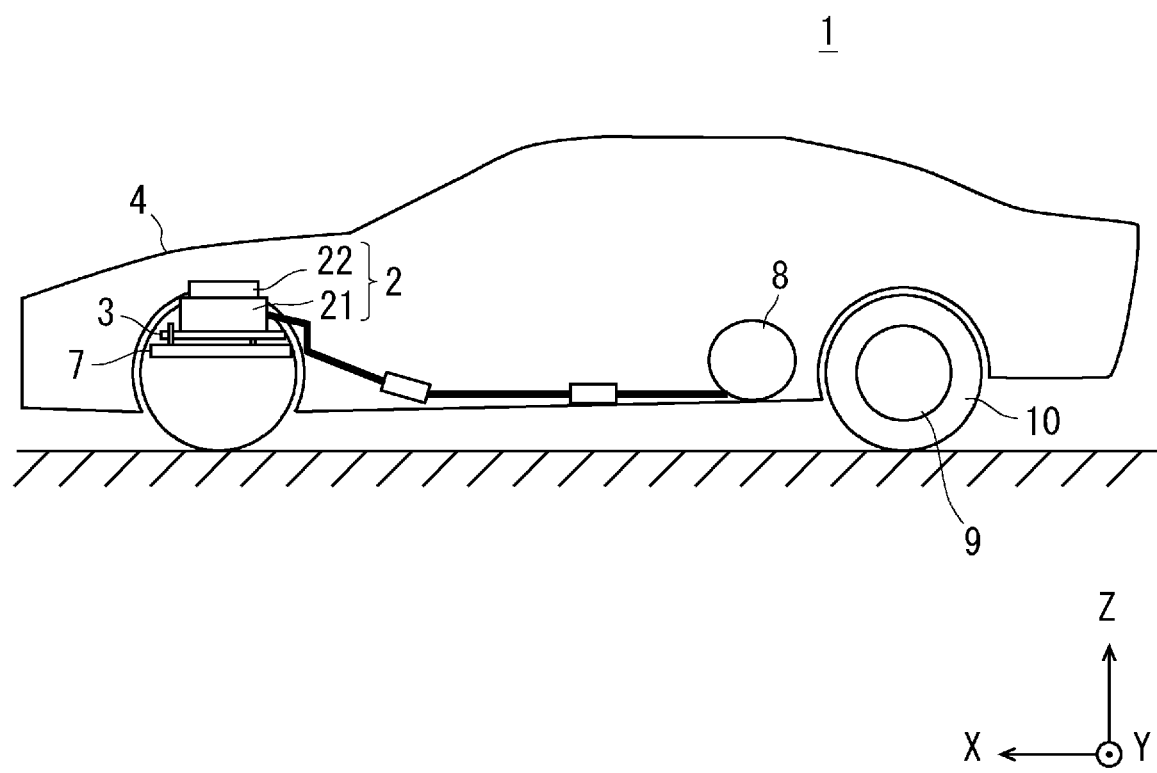
FIG. 1 is a view schematically showing a fuel cell vehicle according to a first embodiment.
Figure 2:
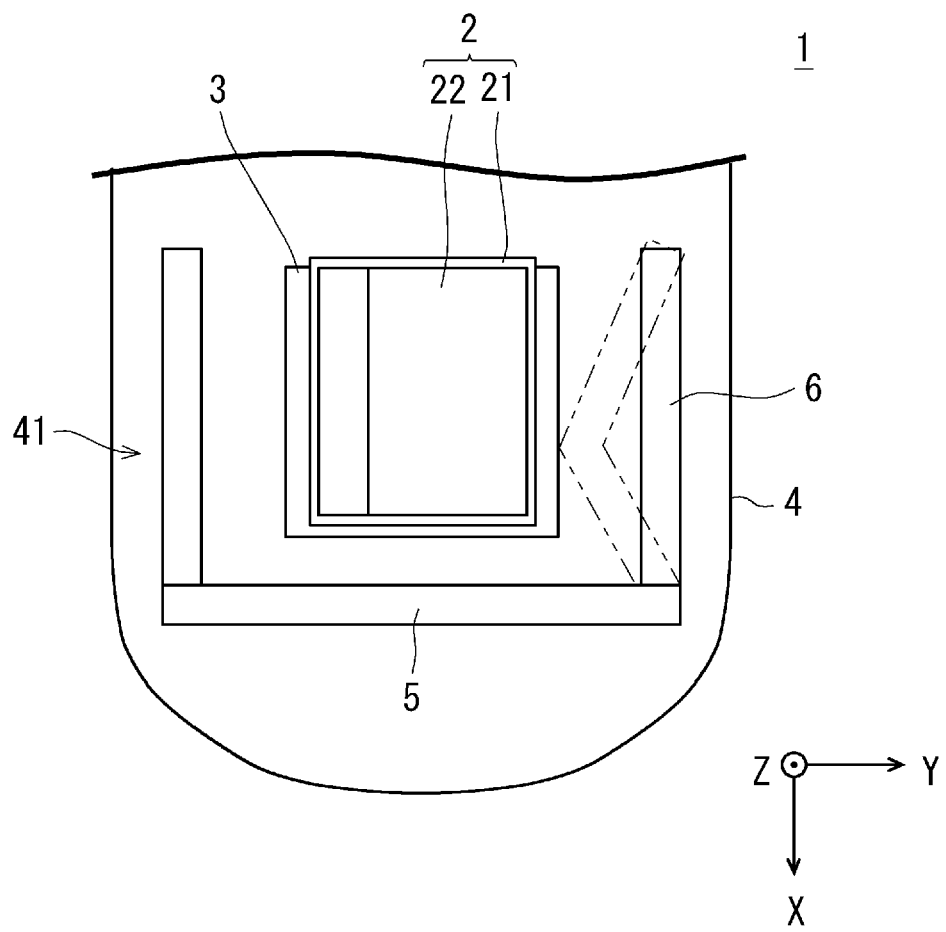
FIG. 2 is a plan view schematically showing the simplified inside of a front room of the fuel cell vehicle according to the first embodiment.
Figure 3:
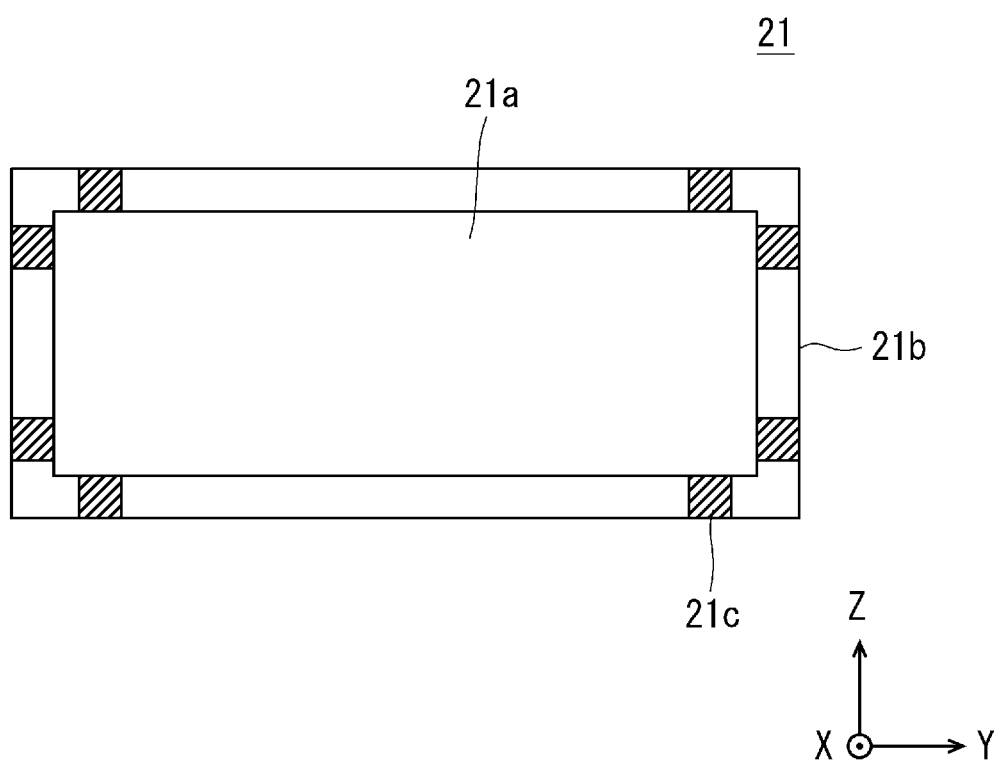
FIG. 3 is a cross-sectional view schematically showing a simplified stack body of the fuel cell vehicle according to the first embodiment.

First, a basic configuration of a fuel cell vehicle according to this embodiment is briefly described. FIG. 1 is a view schematically showing the fuel cell vehicle according to this embodiment. FIG. 2 is a plan view schematically showing the simplified inside of a front room of the fuel cell vehicle according to this embodiment. FIG. 3 is a cross-sectional view schematically showing a simplified stack body of the fuel cell vehicle according to this embodiment.

Note that hereinafter, three-dimensional (XYZ) coordinate systems are used for the clarification of the explanation. Note that the X-axis positive side is the front of the fuel cell vehicle, the X-axis negative side is the rear thereof, the Y-axis positive side is the left side thereof, the Y-axis negative side is the right side thereof, the Z-axis positive side is the upper side thereof, and the Z-axis negative side is the lower side thereof.

In a fuel cell vehicle 1 according to this embodiment, for example, a stack 2 is housed inside a front room 41 of a body 4 while it is mounted on a stack frame 3 as shown in FIGS. 1 and 2.

Note that as shown in FIG. 2, at least a tip of the stack frame 3 on the X-axis positive side is protected by a front member 5, which is a part of a vehicle body. Then, at least both ends of the stack frame 3 in the Y-axis direction are protected by a side member 6, which is a part of a vehicle body.

That is, as viewed from the Z-axis direction, the front member 5 and the side member 6 are arranged in a substantially U-shaped manner so that they surround at least the tip of the stack frame 3 on the X-axis positive side and both ends of the stack frame 3 in the Y-axis direction.

In this case, the side member 6 functions as a deformation part that is deformed so as to bend and then absorbs an impact as shown in FIG. 2 when a surface of the fuel cell vehicle 1 on the X-axis positive side collides with a rigid body. Note that in FIG. 2, a state in which the side member 6 is deformed is shown by a dot-dot-dash line.

The stack 2 includes a stack body 21 and a power control unit 22 as shown in FIG. 1, and is fixed to a suspension frame 7, which is a part of a vehicle body, via the stack frame 3. As shown in FIG. 3, in the stack body 21, a plurality of cells 21a stacked in the X-axis direction are housed inside a housing 21b.

The cell 21a is formed by sandwiching an electrolyte membrane composed of an ion exchange membrane between an anode and a cathode from the X-axis direction and then sandwiching the anode and the cathode, which are sandwiching the electrolyte membrane, between a pair of separators from the X-axis direction.

A laminate of the cell 21a is held inside the housing 21b by a spacer 21c composed of an elastic body such as rubber. Note that in FIG. 3, the stack body 21 is simplified by omitting a plurality of through holes and the like through which air, hydrogen, and cooling water flow, which are formed in the cell 21a.

The above-described stack body 21 generates electric power by causing a chemical reaction between oxygen contained in the air supplied to the cathode of the stack 2 and hydrogen supplied from the hydrogen tank 8 to the anode of the stack 2, thereby driving a motor 9. A driving force of the motor 9 is transmitted to wheels 10, whereby the fuel cell vehicle 1 travels. The stack body 21 and the motor 9 described above are controlled by the power control unit 22.

Figure 4:
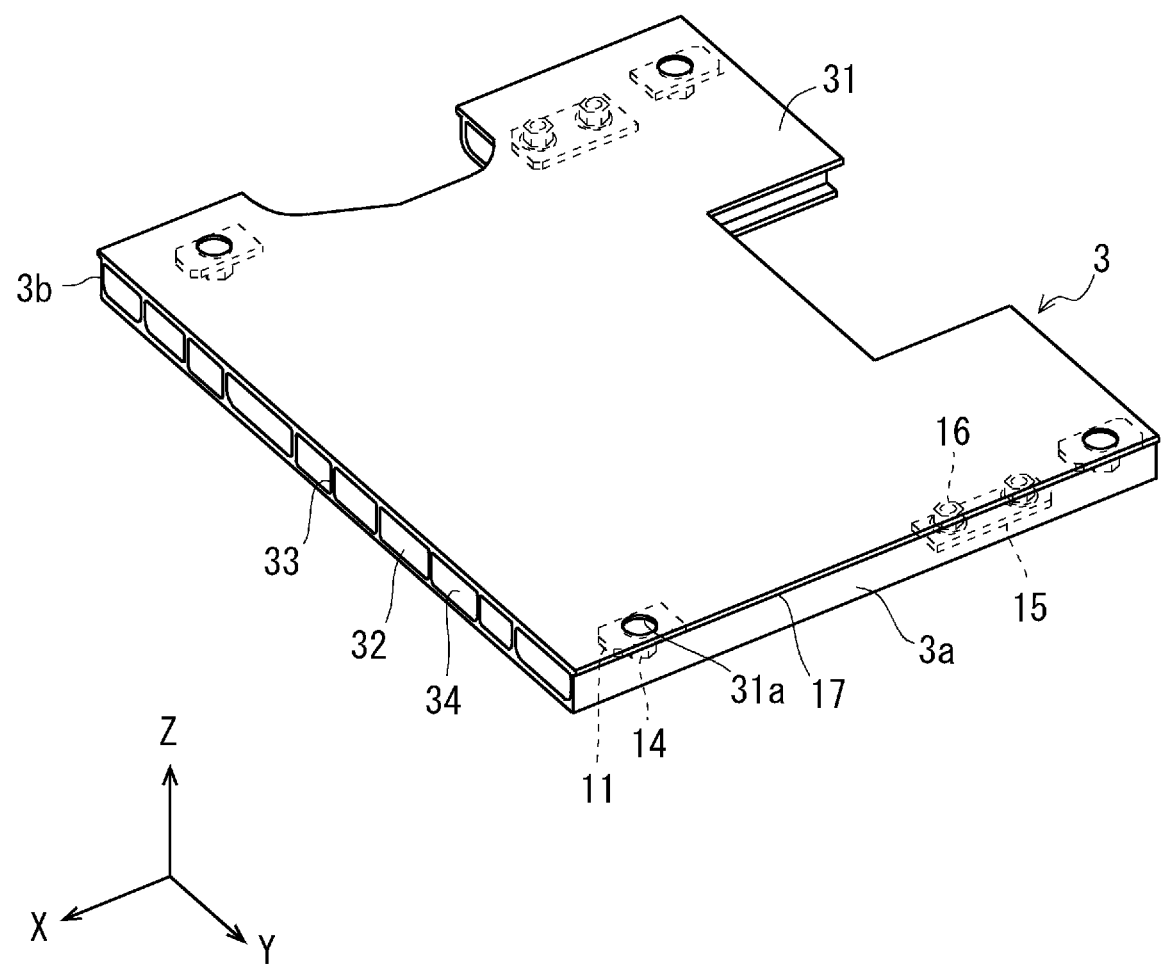
FIG. 4 is a perspective view schematically showing a stack frame of the fuel cell vehicle according to the first embodiment.
Figure 5:
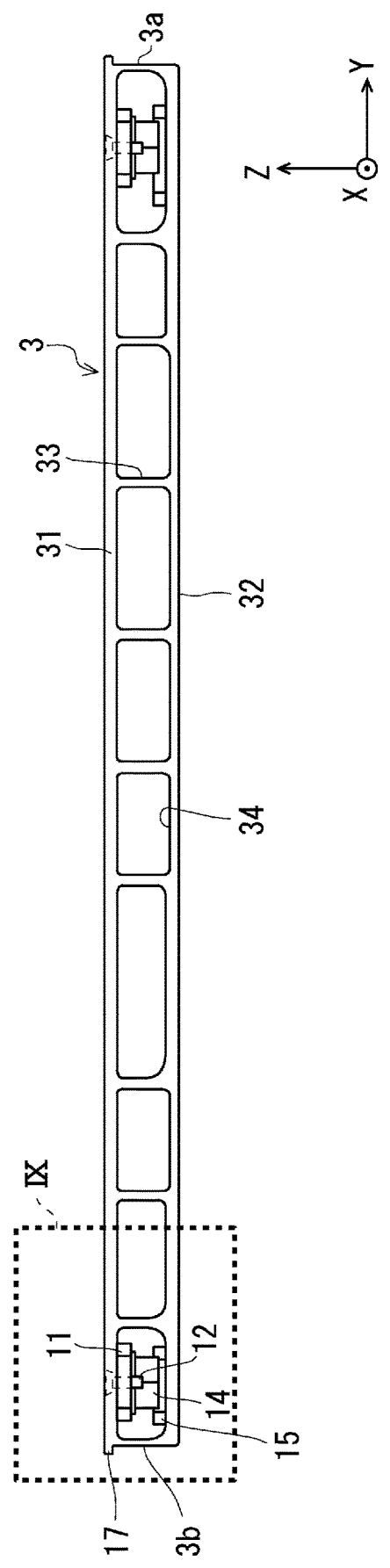
FIG. 5 is a front view schematically showing the stack frame of the fuel cell vehicle according to the first embodiment.

Next, a configuration of the stack frame of the fuel cell vehicle according to this embodiment is described. FIG. 4 is a perspective view schematically showing the stack frame of the fuel cell vehicle according to this embodiment. FIG. 5 is a front view schematically showing the stack frame of the fuel cell vehicle according to this embodiment.

As shown in FIGS. 4 and 5, the stack frame 3 basically has a flat-plate shape, and has a strength higher than the preset collision force causing damage to the stack 2. In detail, the stack frame 3 is reinforced by connecting a first flat plate 31 on the Z-axis positive side and a second flat plate 32 on the Z-axis negative side by a rib part 33, which is, for example, a product molded by extrusion of aluminum. That is, the stack frame 3 has a configuration in which a plurality of hollow parts 34 penetrating in the X-axis direction are arranged in the Y-axis direction.

Note that although the stack frame 3 in the example of the figure is an integrally molded product, it may be divided into a plurality of parts in accordance with, for example, a size of a molding die. In this case, the stack frame 3 can be formed by bonding the divided molded products together by means of welding or the like. Note that a shape of the stack frame 3 is not limited to a particular shape, thus it may be any shape that has a width wide enough to surround the stack 2 as viewed from the Z-axis direction and that allows the stack 2 to be mounted on the stack frame 3.

Figure 6:
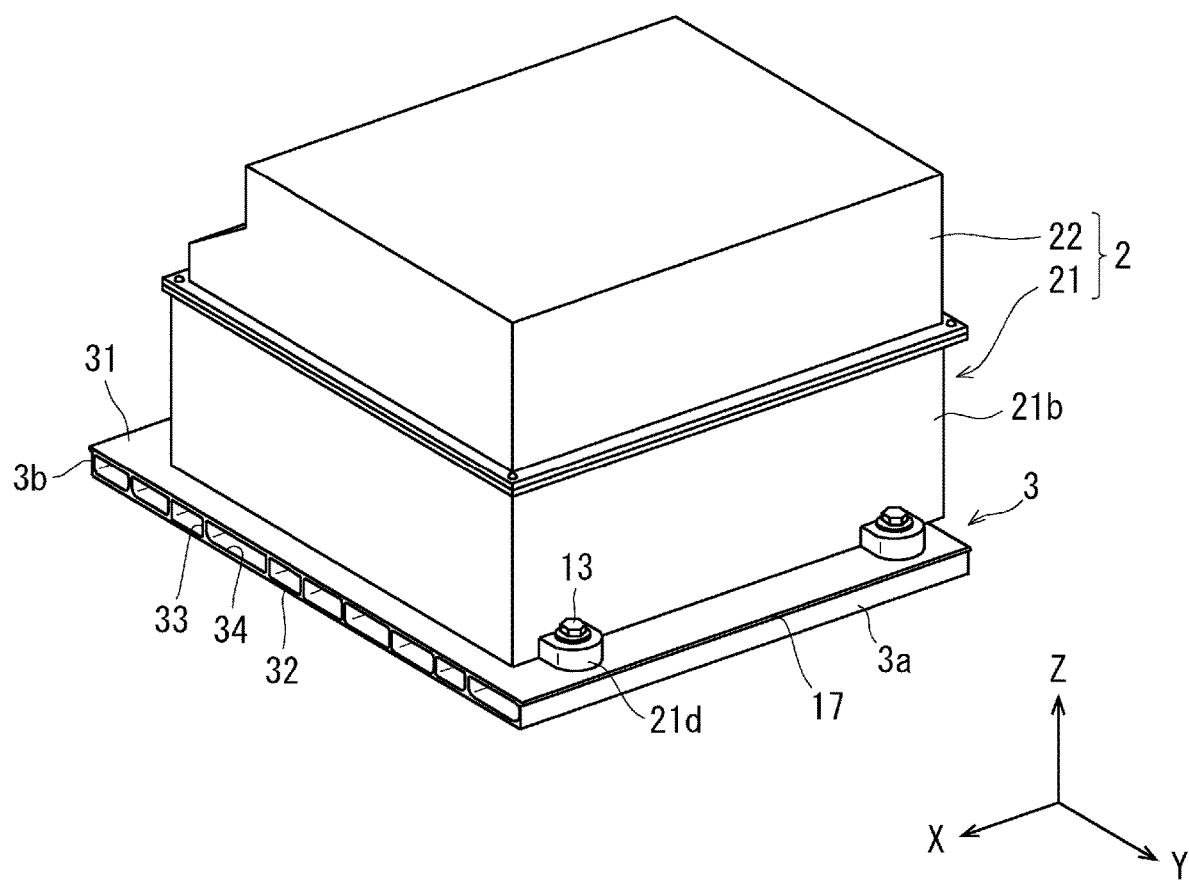
FIG. 6 is a perspective view schematically showing a state in which a stack is mounted on the stack frame in the fuel cell vehicle according to the first embodiment.
Figure 7:
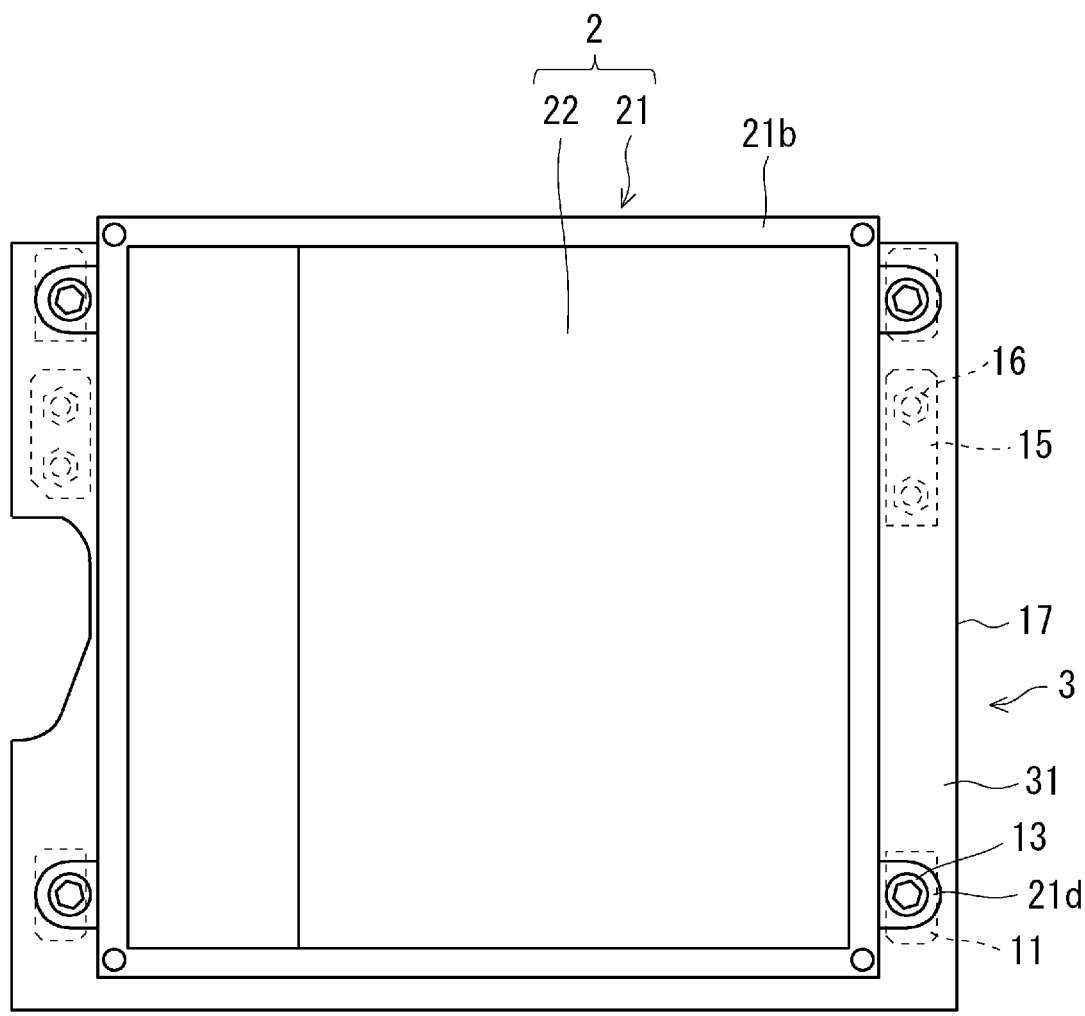
FIG. 7 is a plan view schematically showing a state in which the stack is mounted on the stack frame in the fuel cell vehicle according to the first embodiment.
Figure 8:
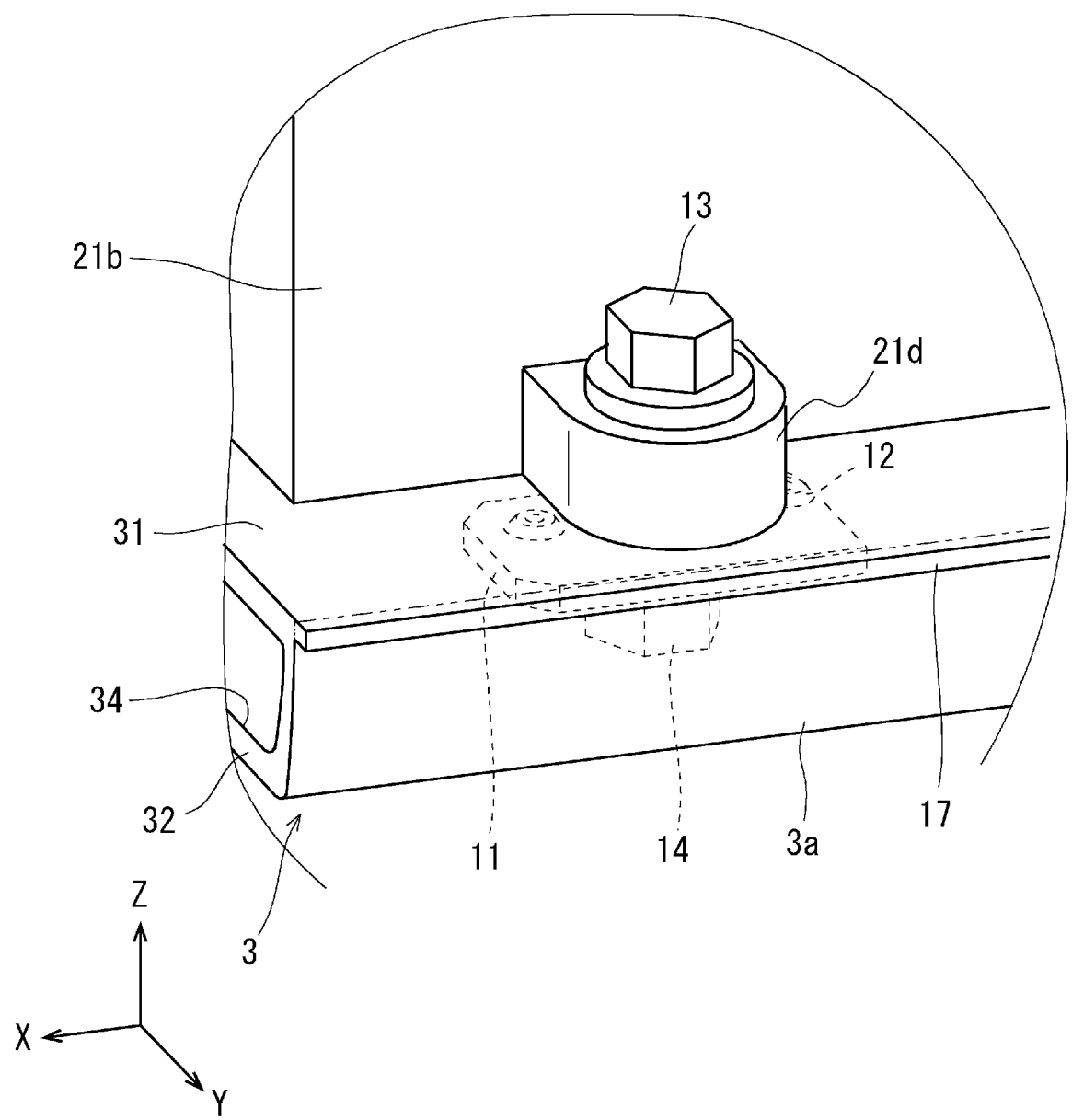
FIG. 8 is an enlarged perspective view showing a fixed part of the stack and the stack frame.

FIG. 6 is a perspective view schematically showing a state in which the stack is mounted on the stack frame in the fuel cell vehicle according to this embodiment. FIG. 7 is a plan view schematically showing a state in which the stack is mounted on the stack frame in the fuel cell vehicle according to this embodiment. FIG. 8 is an enlarged perspective view showing a fixed part of the stack and the stack frame.

The stack 2 is located on the surface of the stack frame 3 on the Z axis positive side, and as shown in FIGS. 6 and 7, the stack 2 and the stack frame 3 are joined with bolts. More specifically, as shown in FIG. 4, a through hole 31a, which penetrates the first flat plate 31 in the Z-axis direction from the hollow part 34 located on the most Y-axis positive side and the most Y-axis negative side of the stack frame 3, is formed.

Further, as shown in FIG. 8, a first reinforcing plate 11 is inserted into the hollow part 34 located on the most Y-axis positive side and the most Y-axis negative side of the stack frame 3. The first reinforcing plate 11 is a rectangular flat plate, and a through hole penetrating the first reinforcing plate 11 in the Z-axis direction is formed thereon.

The first reinforcing plate 11 is fixed to the first flat plate 31 by a rivet 12 while the above-described through hole of the first reinforcing plate 11 is located coaxially with the through hole 31a of the first flat plate 31.

Further, while a through hole formed in a fixing piece 21d of the housing 21b of the stack body 21 is located coaxially with the through hole 31a of the first flat plate 31 and the through hole of the first reinforcing plate 11, bolts 13 are passed through the through hole of the stack body 21, the through hole 31a of the first flat plate 31, and the through hole of the first reinforcing plate 11, and then nuts 14 are screwed onto the bolts 13, so that the stack 2 is fixed to the stack frame 3.

The stack frame 3, to which the stack 2 is fixed as described above, and the suspension frame 7 are joined with bolts, the illustration of which is omitted. In detail, a through hole is formed so as to penetrate the second flat plate 32 in the Z-axis direction from the hollow part 34 located on the most Y-axis positive side and the most Y-axis negative side of the stack frame 3.

Further, as shown in FIG. 4, a second reinforcing plate 15 is inserted into the hollow part 34 located on the most Y-axis positive side and the most Y-axis negative side of the stack frame 3. The second reinforcing plate 15 is a rectangular flat plate, and a through hole penetrating the second reinforcing plate 15 in the Z-axis direction is formed thereon. The second reinforcing plate 15 is fixed to the second flat plate 32 while the above-described through hole of the second reinforcing plate 15 is located coaxially with a through hole of the second flat plate 32.

Further, while the through holes of the second flat plate 32 and the through holes of the second reinforcing plate 15 are located coaxially with through holes formed in the suspension frame 7, bolts are passed through the through holes of the second flat plate 32, the through holes of the second reinforcing plate 15, and the through holes of the suspension frame 7, then nuts 16 are screwed onto the bolts, so that the stack frame 3, to which the stack 2 is fixed, is fixed to the suspension frame 7. In this way, the stack 2 is fixed to the suspension frame 7 via the stack frame 3.

A fragile part 17 is located so as to come into contact with a side surface of the above-described stack frame 3 that is orthogonal to a direction in which the cells 21a in the stack 2 are stacked, that is, each of a side surface 3a on the Y-axis positive side and a side surface 3b on the Y-axis negative side of the stack frame 3. For example, as shown in FIG. 5, the fragile part 17 is a projection part that is projected from each of the side surfaces 3a and 3b of the stack frame 3, and is integrally formed with the stack frame 3. Note that he fragile part 17 may be located so as to come into contact with the side surface of the stack frame 3 that is orthogonal to the direction in which the cells 21a in the stack 2 are stacked.

Figure 9:
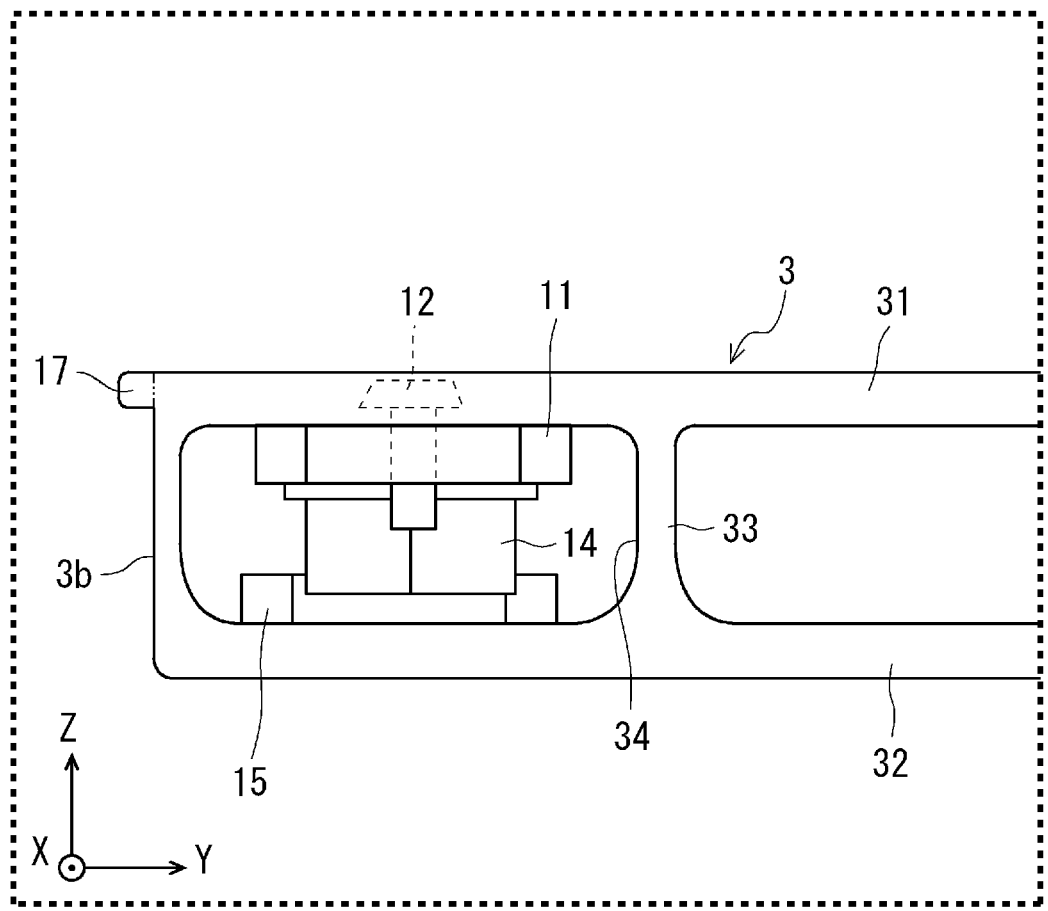
FIG. 9 is an enlarged diagram of a part IX of FIG. 5.

FIG. 9 is an enlarged diagram of a part IX of FIG. 5. Note that in FIGS. 8 and 9, the boundary between the stack frame 3 and the fragile part 17 is indicated by a dot-dot-dash line. As shown in FIGS. 5 and 9, the fragile part 17 has a substantially rectangular YZ cross section, and is projected toward the outside of the stack frame 3 from a part of the Z-axis positive side of each of the side surfaces 3a and 3b of the stack frame 3. Further, the fragile part 17 extends in the X-axis direction, and is located substantially in the entire area in the X-axis direction of each of the side surfaces 3a and 3b of the stack frame 3.

The above-described fragile part 17 is deformed when a preset collision force causing damage to the stack 2 is applied. That is, the strength of the fragile part 17 is lower than the preset collision force causing damage to the stack 2.

The collision force causing damage to the stack 2 is equal to a proof stress of the stack 2, and the proof stress of the stack 2 can be obtained by the sum of a friction force between the adjacent cells 21a and a reaction force (i.e., a force at which the spacer 21c restrains the cells 21a) of the spacer 21c. The frictional force between the adjacent cells 21a and the reaction force of the spacer 21c can be derived in advance by analysis or the like, and consequently the collision force causing damage to the stack 2 can be set in advance.

A load at which the fragile part 17 is deformed can be obtained by the product of a material strength of the stack frame 3 and the XZ cross-sectional area of the fragile part 17. The material strength of the stack frame 3 is disclosed in advance as the properties of materials constituting the stack frame 3.

Note that when the fuel cell vehicle 1 collides with a rigid body as described above, the side member 6 is deformed so as to bend as shown in FIG. 2, however the range of the fragile part 17 in the X-axis direction, with which the side member 6 comes into contact when it is bent, can be estimated in advance by analysis or the like. In other words, no collision force is applied from the side member 6 to the other ranges of the fragile part 17 in the X-axis direction.

Therefore, the XZ cross-sectional area of the fragile part 17 is preferably obtained by the product of a length of the estimated range of the fragile part 17 in the X-axis direction and a height of the same in the Z-axis direction. As described above, by setting the height of the fragile part 17 in the Z-axis direction in the range of the X-axis direction based on the preset collision force causing damage to the stack 2, the material strength of the stack frame 3 disclosed in advance, and the length of the range of the fragile part 17 in the X-axis direction estimated in advance, it is possible to achieve a configuration in which the fragile part 17 is deformed when the preset collision force causing damage to the stack 2 is applied thereto.

In the above-described fuel cell vehicle 1 according to this embodiment, the surface of the fuel cell vehicle 1 on the X-axis positive side collides with a rigid body, then the side member 6 is deformed so as to bend and comes into contact with the fragile part 17, and a collision force is applied to the fragile part 17 via the side member 6. That is, a collision force in the Y-axis direction, which causes the cells 21a in the stack 2 to be laterally displaced, is applied to the fragile part 17.

When a collision force applied to the fragile part 17 is equal to or greater than the preset collision force causing damage to the stack 2, the fragile part 17 is deformed. In this case, a collision force equal to or greater than the collision force causing damage to the stack 2 is applied to the stack 2 via the stack frame 3 from the Y-axis direction. Thus, for example, when a lateral displacement or the like has occurred in the cells 21a but there is no external damage on the stack 2, it is impossible to recognize that the stack 2 is damaged, due to the lateral displacement or the like that has occurred in the cells 21a, in the Y-axis direction orthogonal to the direction in which the cells 21a are stacked by only visually observing the stack 2.

However, in this embodiment, the fragile part 17 is deformed as described above, thus it is possible to determine, by visually observing the fragile part 17, whether the stack 2 is damaged in the Y-axis direction orthogonal to the direction in which the cells 21a in the stack 2 are stacked even if there is no external damage on the stack 2.

As described above, the fuel cell vehicle 1 according to this embodiment can determine, by visually observing the fragile part 17, whether the stack 2 is damaged in the Y-axis direction orthogonal to the direction in which the cells 21a in the stack 2 are stacked, thereby enabling an acceleration sensor and a pressure sensor for detecting a collision force applied to the stack 2, which are mounted on a typical fuel cell vehicle, to be omitted.

Thus, the fuel cell vehicle 1 according to this embodiment can determine, when the fuel cell vehicle 1 collides with a rigid body, whether the stack 2 is damaged in the Y-axis direction orthogonal to the direction in which the cells 21a in the stack 2 are stacked by a visual observation at a low cost. Further, the fuel cell vehicle 1 according to this embodiment can easily determine whether the stack 2 is damaged by only visually observing the fragile part 17.

Second Embodiment

Figure 10:
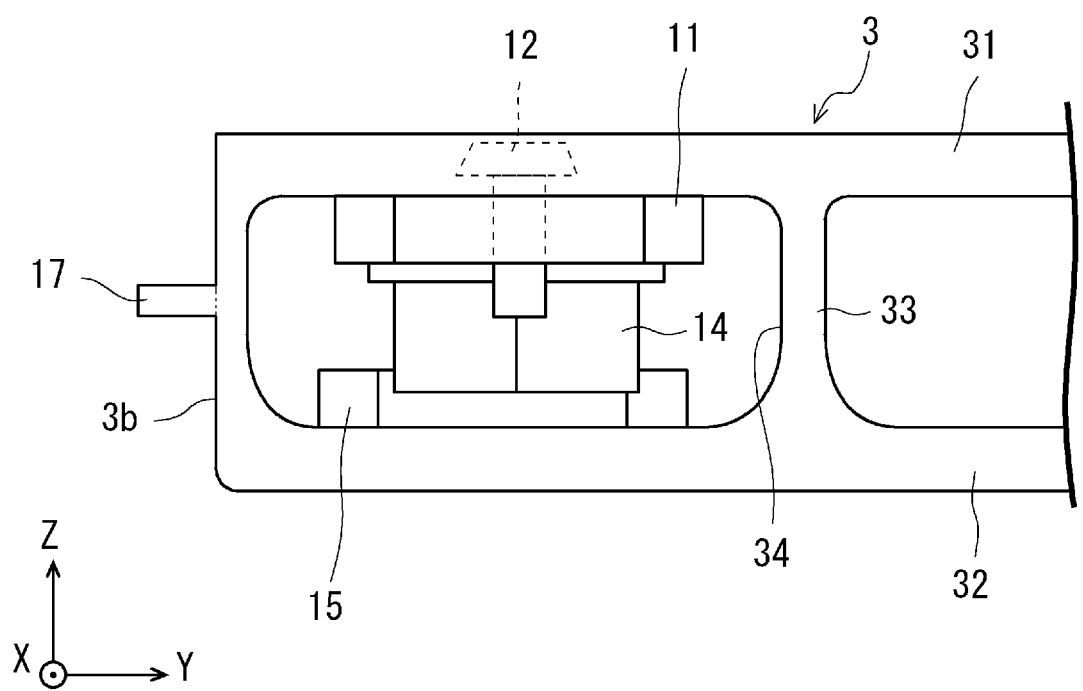
FIG. 10 is an enlarged view schematically showing the periphery of a fragile part in the fuel cell vehicle according to a second embodiment.

FIG. 10 is an enlarged view schematically showing the periphery of the fragile part in the fuel cell vehicle according to this embodiment. Note that in FIG. 10, the boundary between the stack frame and the fragile part is indicated by a dot-dot-dash line. In the first embodiment, the fragile part 17 is projected toward the outside of the stack frame 3 from a part of the Z-axis positive side of each of the side surfaces 3a and 3b of the stack frame 3. However, a location in the Z-axis direction where the fragile part 17 is projected from each of the side surfaces 3a and 3b of the stack frame 3 is not limited. For example, as shown in FIG. 10, the fragile part 17 may be projected toward the outside of the stack frame 3 from substantially the center of the side surface 3a (3b) of the stack frame 3 in the Z-axis direction.

Third Embodiment

Figure 11:
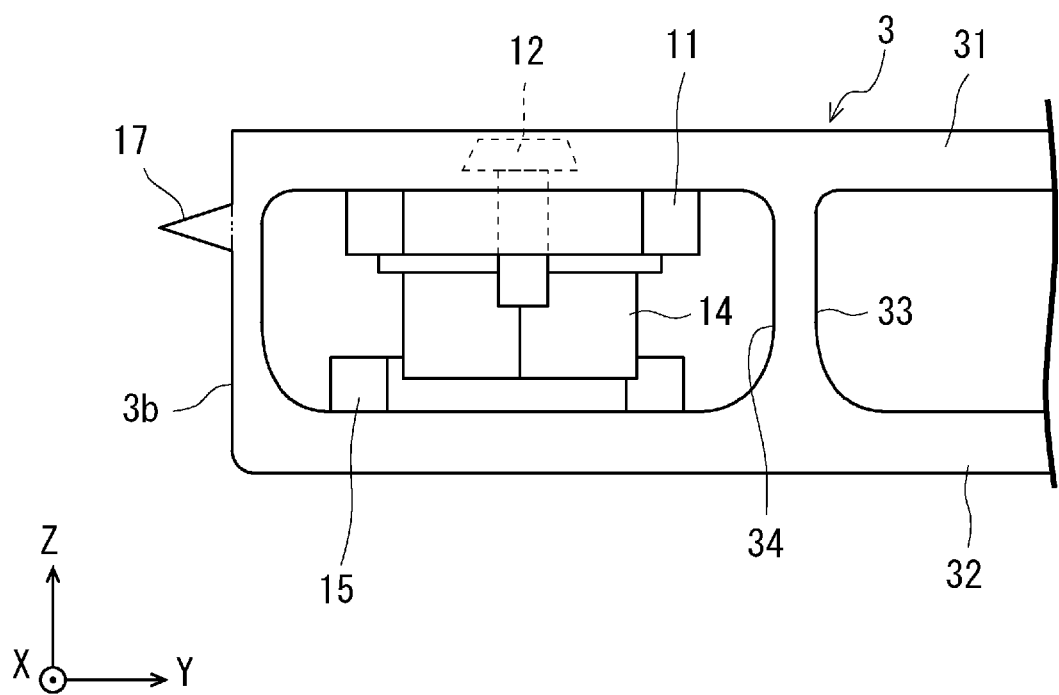
FIG. 11 is an enlarged view schematically showing the periphery of the fragile part in the fuel cell vehicle according to a third embodiment.

FIG. 11 is an enlarged view schematically showing the periphery of the fragile part in the fuel cell vehicle according to this embodiment. Note that in FIG. 11, the boundary between the stack frame and the fragile part is indicated by a dot-dot-dash line. The shape of the YZ cross section of the fragile part 17 according to the first embodiment is substantially rectangular, but the shape thereof is not limited. It should be noted that for example, as shown in FIG. 11, the shape of the YZ cross section is preferably a substantially triangular so that the height (thickness) of the fragile part 17 in the Z-axis direction becomes thinner toward the outside of the stack frame 3.

Here, the XZ cross-sectional area of the fragile part 17 when the load at which the fragile part 17 is deformed is obtained may be, for example, the XZ cross-sectional area at the center of the width of the fragile part 17 in the Y-axis direction. Thus, the tip of the fragile part 17 can be greatly deformed when a collision force is applied to the fragile part 17, whereby a deformation of the fragile part 17 can be easily visually observed.

Note that the XZ cross-sectional area of the fragile part 17 when the load at which the fragile part 17 is deformed is obtained may be a cross-sectional area of any XZ cross section other than that of the tip of the fragile part 17.

The present disclosure is not limited to the above-described embodiments, and can be appropriately changed without departing from the spirit of the disclosure.

In the above-described embodiments, although the fragile part 17 is integrally formed with the stack frame 3, the fragile part 17, for example, may be formed of a resin or the like and attached to each of the side surfaces 3a and 3b of the stack frame 3. In short, the fragile part 17 may be located so as to come into contact with each of the side surfaces 3a and 3b of the stack frames 3.

Although the fragile part 17 according to the above-described embodiments is located substantially in the entire area in the X-axis direction of each of the side surfaces 3a and 3b of the stack frame 3, the fragile part 17 may be located at least in a range within which the side member 6 comes into contact with the fragile part 17 when it is bent. However, if the fragile part 17 is located substantially in the entire area in the X-axis direction of the side surfaces 3a and 3b of the stack frame 3, the fragile part 17 can be easily formed together with the stack frame 3.

From the disclosure thus described, it will be obvious that the embodiments of the disclosure may be varied in many ways. Such variations are not to be regarded as a departure from the spirit and scope of the disclosure, and all such modifications as would be obvious to one skilled in the art are intended for inclusion within the scope of the following claims.

What is claimed is:

1. A fuel cell vehicle in which a stack is fixed to a vehicle body via a stack frame, the fuel cell vehicle comprising:
   a fragile part configured to be located so as to come into contact with a side surface of the stack frame that is orthogonal to a direction in which cells in the stack are stacked while the stack is fixed to the stack frame, and be deformed when a preset collision force causing damage to a stack is applied; and
   a deformation part configured to form a part of the vehicle body, and be deformed and come into contact with the fragile part when a collision force is applied to the vehicle body.

2. The fuel cell vehicle according to claim 1, wherein the fragile part is a projection part configured to be projected from the side surface of the stack frame that is orthogonal to the direction in which the cells in the stack are stacked.

3. The fuel cell vehicle according to claim 1, wherein a thickness of the fragile part becomes thinner toward an outside of the stack frame.

4. The fuel cell vehicle according to claim 1, wherein the fragile part is provided to the stack frame.

5. The fuel cell vehicle according to claim 1, wherein strength of the fragile part is weaker than strength of the stack frame.

* * * * *